US005904466A

United States Patent [19]

Miller et al.

[11] Patent Number: 5,904,466

[45] Date of Patent: May 18, 1999

[54] STORAGE DEVICE FOR CARD-SHAPED DATA CARRIERS

[75] Inventors: Norbert Miller; Peter Höffges, both of Mönchengladbach, Germany

[73] Assignee: Scheidt & Bachmann GmbH, Mönchengladbach, Germany

[21] Appl. No.: 09/146,916

[22] Filed: Sep. 2, 1998

[30] Foreign Application Priority Data

Sep. 2, 1997 [EP] European Pat. Off. .............. 97115156

[51] Int. Cl.[6] .................................................. B65G 59/02

[52] U.S. Cl. ....................... 414/796.7; 187/270; 221/190; 254/313; 414/924

[58] Field of Search .................................... 187/251, 254, 187/270, 411; 254/283, 286, 313; 221/186, 187, 190; 414/796.7, 796.8, 924, 926

[56] References Cited

U.S. PATENT DOCUMENTS

| | | | |
|---|---|---|---|
| 651,236 | 6/1900 | Corcoran | 187/270 X |
| 3,416,705 | 12/1968 | Hohmann . | |
| 4,851,651 | 7/1989 | Gaucher . | |
| 4,921,388 | 5/1990 | Nelson | 414/796.7 X |
| 5,240,370 | 8/1993 | Furukawa et al. | 414/796.7 X |
| 5,664,771 | 9/1997 | Nagatani et al. | 271/10.03 |

FOREIGN PATENT DOCUMENTS 0542226 5/1993 European Pat. Off. .

*Primary Examiner*—Janice L. Krizek
*Attorney, Agent, or Firm*—Robert W. Becker & Associates

[57] ABSTRACT

A storage device for card-shaped data carriers has at least one storage unit with a magazine support and a magazine mounted on the magazine support. The storage unit has a support bottom on which data carriers are stacked and has an upper end with a dispensing slot. An individualization roller is positioned at the upper end for removing the uppermost data carrier from the storage unit through the dispensing slot. A transport device for transporting the data carrier exiting from the dispensing slot to a processing unit of a dispenser is provided. A carriage is mounted in the magazine support and vertically slidable in the magazine support. The support bottom is fastened to the carriage. A motor is provided that drives an endless, flexible pulling element connected to the motor, and the motor and pulling element drive the carriage. Two guide pulleys are connected to opposite ends of the magazine support and the pulling element is guided about the guide pulleys. The carriage has two freely rotating drive rollers and a differential gear connecting the drive rollers. The drive rollers rotate in the same direction and have identical diameters. The drive rollers are driven by the pulling element for driving the carriage.

20 Claims, 7 Drawing Sheets

STORAGE DEVICE FOR CARD-SHAPED DATA CARRIERS

BACKGROUND OF THE INVENTION

The present invention relates to a storage device for card-shaped data carriers with at least one storage unit in which the card-shaped data carriers are stacked on a vertically movable support bottom and from which the respectively uppermost data carrier is laterally removable through a dispensing slot by an individualization roller and a cooperating drive roller for transferring the data carrier to a processing unit or a dispensing unit arranged downstream.

Such storage devices for card-shaped data carriers are known in different embodiments, for example, for dispensing access cards for parking garages. In European patent application 96 110 551.7 a self-filling storage device for card-shaped data carriers is disclosed which is comprised of a plurality of storage units and allows an automatic filling and/or emptying of all storage units.

The invention has therefore the object to provide a storage device of the aforementioned kind with at least one storage unit which is constructively simple and thus inexpensive to produce and whose basic design allows a modular construction and also provides for high functional reliability so that the storage device can be adapted to various specifications.

SUMMARY OF THE INVENTION

This object is inventively solved in that the support bottom is arranged on a carriage which can be vertically moved within a magazine support and is driven by an endless flexible pulling element that is, in turn, driven by a motor and guided about two guide pulleys positioned outside of the movement range of the carriage within the magazine support. The pulling element drives two drive rollers of identical diameter freely supported at the carriage whereby the two drive rollers which rotate in the same direction are connected to one another by a differential gear.

The endless flexible pulling element, for example, a toothed belt or a chain, guided about the guide pulleys is driven by a motor in two possible rotary directions and drives with one side of the endless pulling element one of the two drive rollers which are freely rotatably supported at the carriage. Since these drive rollers have the same diameter and are driven in the same rotary direction, no movement of the carriage would result. Movement is achieved in that the two drive rollers are connected to one another by a differential gear. This differential gear has the effect that the rotary angle of the two drive rollers despite their identical diameter is different. Since the two sides of the flexible pulling element are forcedly moved at the same velocity, a relative movement of the carriage relative to the flexible pulling element and thus to the magazine support is forced. The direction and magnitude of this relative movement depends on the rotational direction of the motor and the difference of the rotary angle of the drive rollers so that this is determined by the embodiment of the respective differential gear.

According to a further feature of the invention the differential gear is formed by two differential rollers that are connected to one another by an endless, flexible connecting element, whereby the differential rollers are respectively fastened to the shaft of one of the drive rollers and have different diameters. Due to the different diameters of the differential rollers and their connection to one another by an endless flexible connecting element, in particular, a toothed belt or a chain, the drive rollers experience different rotary angles causing the carriage supporting the drive rollers to perform a compensation movement in the longitudinal direction of the circulating flexible pulling element, i.e., in the longitudinal direction of the magazine support on which the guide pulleys for the flexible pulling element are supported. This compensation movement depends on the difference of the diameters of the differential rollers and results in a self-locking drive for the support bottom which allows a linear processing of large forces and a very precise movement of the support bottom over its entire movement range, as is required for the controlled supply of individual card-shaped data carriers to the dispensing slot of the magazine.

In a preferred embodiment of the invention the flexible pulling element and the flexible connecting element are embodied as toothed belts and the drive rollers as well as the differential rollers are toothed gears or wheels so that with minimal technical expenditure slip between these driving parts is eliminated.

In order to ensure a sufficiently large engagement angle of the flexible pulling element at the drive rollers and thus a slip-free force transmission, according to a further feature of the invention the flexible pulling element is guided on both sides of the drive roller about laterally displaced guide rollers.

Furthermore, the invention suggests that the carriage is guided by rollers in the longitudinal direction of the magazine support so that a smooth (nonjarring) movement of the carriage is provided.

According to a further feature of the invention, each storage unit is comprised of a magazine support and an exchangeable magazine for receiving the card-shaped data carriers. The magazine has a stationary magazine bottom and can be secured by two support arms at the magazine support. This allows for a constructively simple design and a simple exchange of each magazine.

The invention also suggests to provide the magazine bottom with at least one cutout for the support bottom. This embodiment allows to connect a filled magazine, in which the card-shaped data carriers are stacked on the magazine bottom, to the magazine support whereby the support bottom is in its lowermost position below the magazine bottom of the magazine. The support bottom moves subsequently vertically upwardly through the cutout of the magazine bottom and receives the card-shaped data carriers which are lifted from the magazine bottom and are thus guided, as needed, to the dispensing slot.

In order to prevent removal of the exchangeable magazine from the magazine support during operation of the storage device, the magazine is embodied according to a further feature of the invention with lateral projecting wall portions engaging lateral recesses of the support bottom. These projecting wall portions prevent removal of the magazine from the magazine support when the support bottom is positioned within the area of the magazine, i.e., within its working range.

In a preferred embodiment of the invention the magazine is embodied with a C-shaped cross-section whereby the facing legs engage respectively one of the oppositely arranged recesses at the support bottom. This results in an especially simple design of the magazine that can be removed from the magazine support only in the lowermost end position of the support bottom.

According to a further feature of the invention, the magazine has a slanted bottom portion and is placed onto correspondingly slanted, downwardly extending support arms which are connected to the magazine support. This slanted embodiment of the magazine at its bottom portion allows its removal when the support bottom is positioned within this slanted portion of the magazine despite the legs extending into the recesses of the support bottom, because the opposing legs end above this slanted portion of the magazine.

The invention furthermore suggests to secure the magazine with a bracket provided at the magazine support. The bracket has a lock bolt engaging a receiving opening of the magazine.

In order to individually remove the card-shaped data carriers from the magazine at the upper lateral dispensing slot, the individualization roller at the upper end is embodied as a drive roller of a selection motor having a motor housing that is pivotable about a pivot axis extending parallel to the motor axis, respectively, the drive shaft. This inventive suggestion results in an especially simple individualization device which can be controlled in a directed manner.

The motor housing of the selection motor is inventively pivotable by its drive shaft that serves as the individualization roller and by the support bottom and the card-shaped data carrier(s) resting thereon into a working position so that a card-shaped data carrier can be dispensed through the lateral dispensing slot of the magazine when the uppermost card-shaped data carrier has been guided into its dispensing position in front of the dispensing slot by the support bottom.

The working position of the individualization roller according to a further feature of the invention is monitored by a switch which is actuated by the pivot movement of the motor housing so that a directed dispensing of the respectively uppermost card-shaped data carrier is possible as soon as it is moved into the dispensing position by movement of the support bottom.

In order to simplify the transport of the dispensed data carrier for further processing in processing units and/or dispensing units downstream of the dispensing slot of the magazine, the transport roller according to a further feature of the invention is arranged laterally above the dispensing slot of the magazine and is driven by a transport motor which at the same time, by an intermediate gear, drives a retaining roller that is arranged below the transport roller and rotates in the same direction as the transport roller. Between the retaining roller and the transport roller a transport gap is provided which has a width that is greater than the thickness but smaller than twice the thickness of the card-shaped data carrier.

This inventive embodiment of the transport device downstream of the individualization device ensures, on the one hand, that only the uppermost card-shaped data carrier is removed from the magazine because a second data carrier entrained by friction by the data carrier to be dispensed is retained by the retaining roller which rotates in a direction counter to the transporting direction of the transport roller.

On the other hand, this basic design of the transport device allows the arrangement of a pair of removal rollers downstream of the transport and retaining rollers. This pair of removal rollers comprises a first removal roller rotated in the same direction as the transport roller by the intermediate gear and a counter removal roller that is loaded by a spring force against the first removal roller. The data carrier to be transported to further processing devices is thus gripped by two roller pairs so that great functional reliability results.

According to a further feature of the invention, the transport roller can be driven in both rotary directions. It cooperates with a pressure roller arranged thereabove so that the gap formed between these two rollers can receive card-shaped data carriers from a neighboring storage element for further transporting whereby this transport gap between these two rollers has coordinated therewith a guide plate for the data carriers coming from the neighboring storage unit.

In order to be able to arrange storage units closely adjacent to one another, it is suggested with the present invention to displace neighboring magazines vertically relative to one another by the width (spacing) of the first transport gap and the second transport gap. This results in a substantially linear transport of the data carrier from the rearmost storage unit to the dispensing unit.

In order to ensure safe guiding of the data carriers which are supplied at different levels, when coming from directly adjacent storage units, a further feature of the invention suggests to provide a guide member above the guide plate that supplies the card-shaped data carriers of the neighboring storage units to the transport gap between the transport roller and the pressure roller.

Furthermore, it is suggested with the invention to arrange the selection motor, the transport motor, and all rollers connected therewith in a support housing that is arranged above the exchangeable magazine and positioned at the front of the magazine support supporting the magazine. This provides for an especially simple construction of the inventive storage device.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. I through 11.

Figure 1:
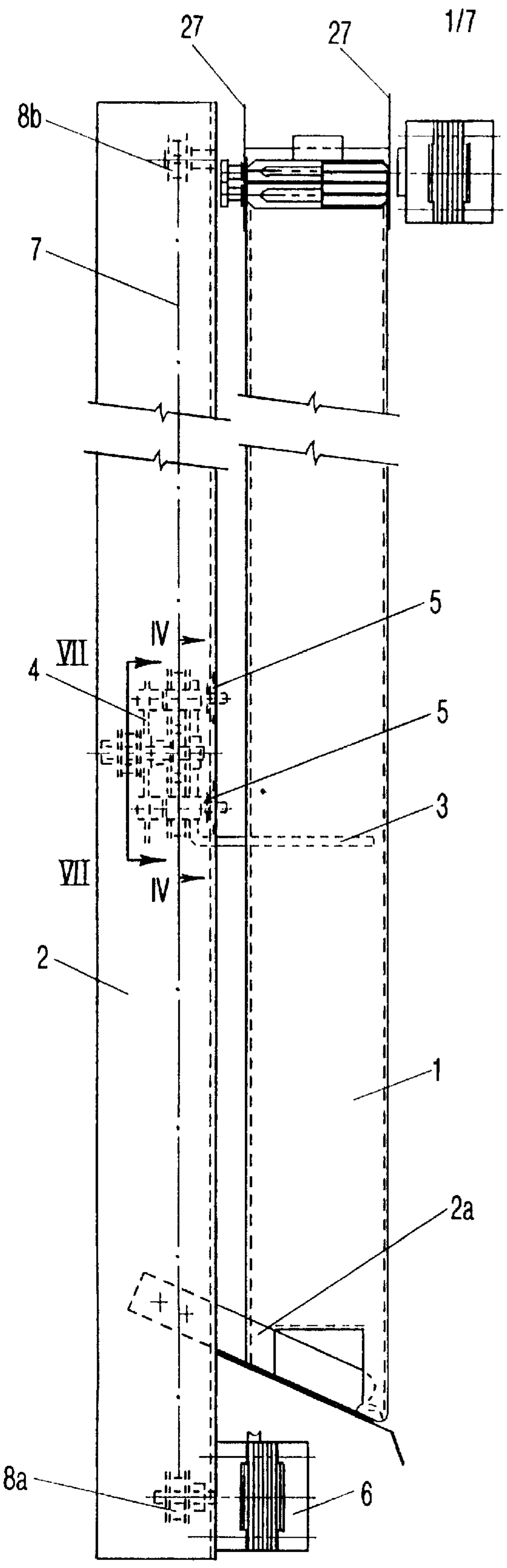
FIG. 1 shows a side view of a storage device.
Figure 2:
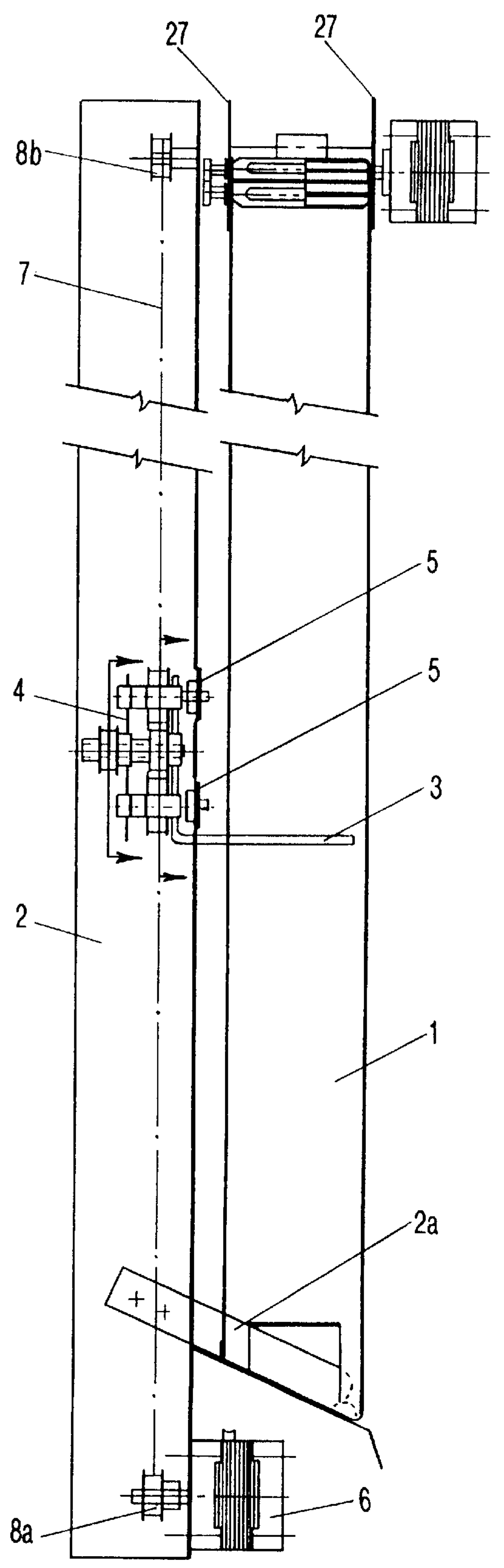
FIG. 2 shows a vertical longitudinal section of the storage device according to FIG. 1.
Figure 3:
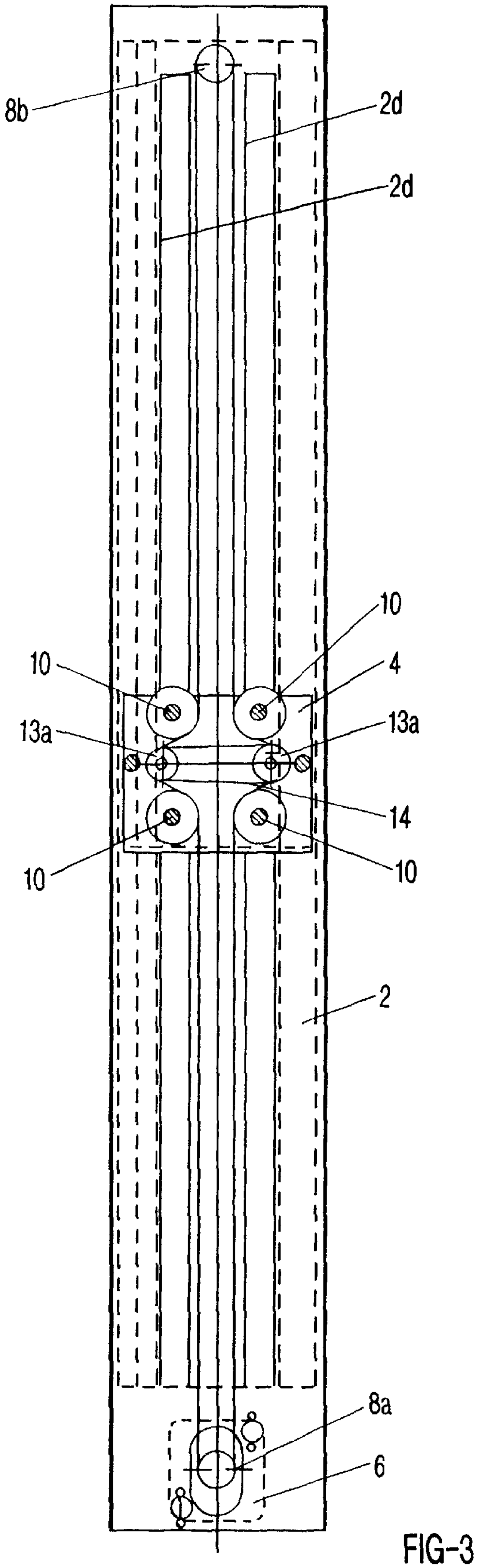
FIG. 3 is a rearview of the storage device according to FIGS. 1 and 2.

The storage device represented in FIGS. 1 through 3 comprises only one storage unit comprised of an exchangeable magazine 1 and a magazine support 2 as well as the corresponding devices for storage and transport of the data carriers D within the magazine 1 as well as for individualization and removal of the individual data carriers D. On the magazine 1 respective data carriers of the same thickness are stored, for example, EC cards, chip cards, transponder cards and magnetic cards. When it is desired to store card-shaped data carriers D of different kinds and thickness, for each type of card and card thickness individual magazines 1 must be provided. The design and function of this magazine 1 and the magazine support 2 forming the storage unit is however identical so that with the aid of FIGS. 1 through 3 only one such storage unit will be explained.

Figure 8:
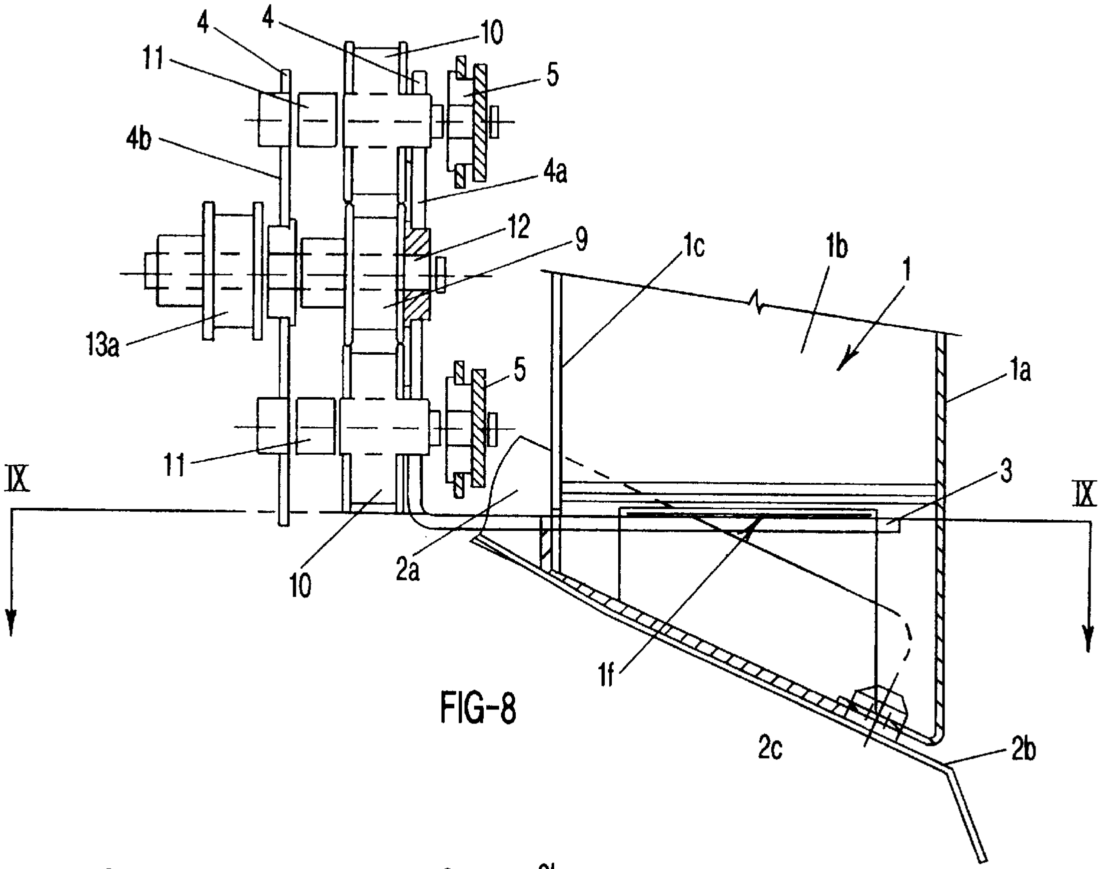
FIG. 8 shows a side view of the carriage in the lower end position and also shows the lower end of the magazine.
Figure 9:
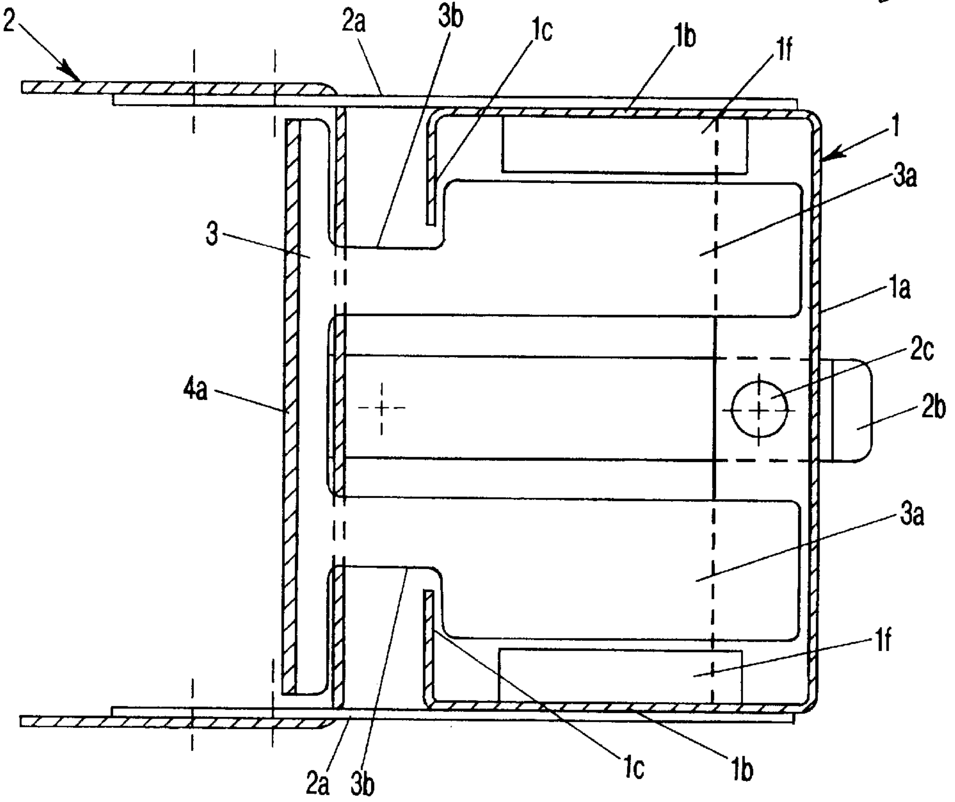
FIG. 9 shows a horizontal section of the magazine according to section line IX—IX of FIG. 8 and a plan view onto the support and magazine bottoms.
Figure 10:
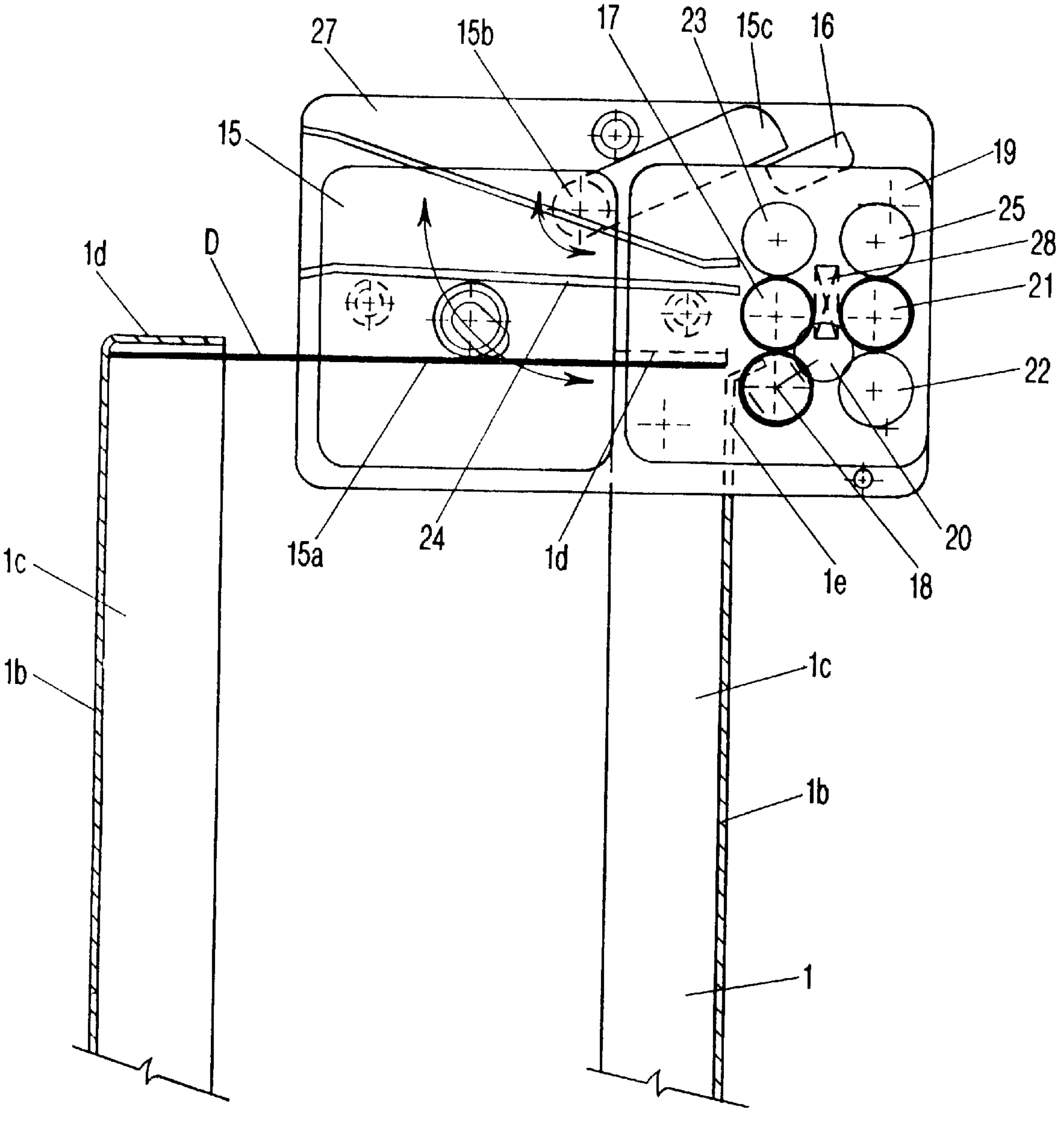
FIG. 10 shows a schematic front view of the upper end of the magazine as well as of the individualization and transporting devices.

In the embodiment represented in the drawing the magazine 1 has a C-shaped cross-section as can be seen especially in FIGS. 8 and 9. To the front side 1*a,* forming the stay of this C-shaped cross-section, parallel extending legs of the C-shaped cross-section forming sidewalls 1*b* of the magazine 1 are positioned at a right angle to the stay. At their ends legs 1*c* are provided extending at a right angle to the sidewalls 1*b* and facing one another. For providing an upper closure the sidewalls 1*b* according to FIG. 10 are bent to form cover strips 1*d.* In the area of the cover strip 1*d,* shown in the right half of FIG. 10, the magazine 1 is provided with a dispensing slot 1*e.*

The bottom portion of the magazine 1 is slanted. In the area of this slanted bottom portion the magazine bottom 1*f* is arranged which, in the shown embodiment, is in the form of two rod-shaped supports at the sidewalls 1*b* which provide between them a through opening for the support bottom 3. The card-shaped data carriers D rest on this magazine bottom If when a filled magazine 1 is positioned at the magazine support 2.

For securing the magazine 1, the magazine support 2, in the shown embodiment having a U-shaped cross-section, is provided at its lower end with two slanted support arms 2*a* having an angular cross-section whereby its vertical leg serves for guiding the magazine laterally and its horizontal leg is provided as a support for the magazine 1. The filled magazine 1 is placed onto the magazine support 2 with its bottom portion leading and guided between the support arms 2*a.* It is subsequently locked by the bracket 2*b* provided at the magazine support 2. The bracket has a locking bolt 2*c* that is received in a respective receiving opening of the magazine 1.

Figure 7:
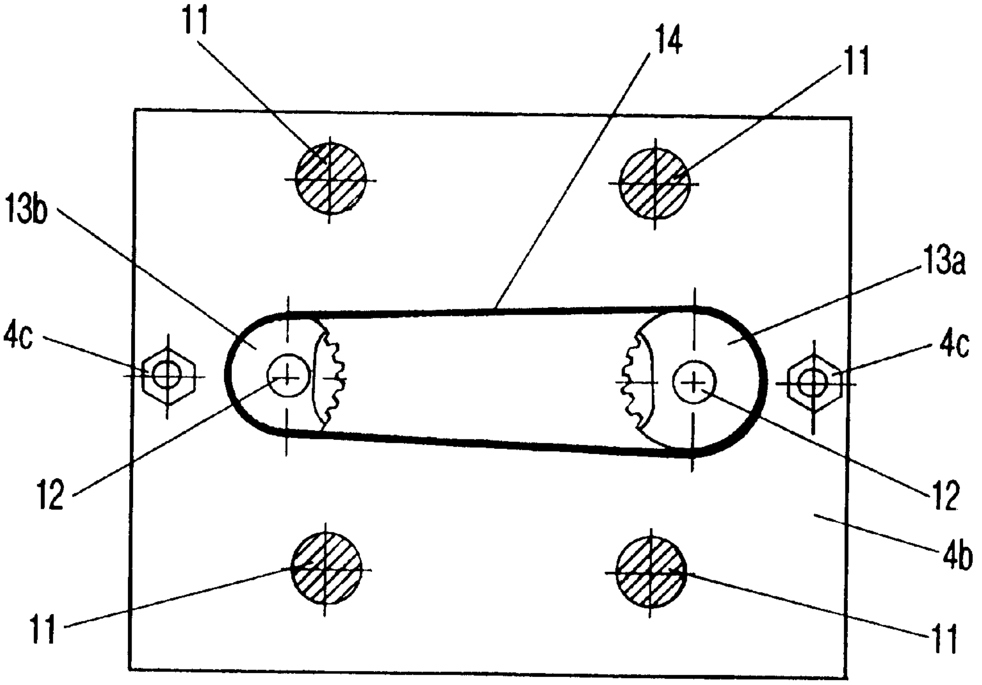
FIG. 7 shows an enlarged representation of the carriage according to the section line VII—VII of FIG. 2.

In order to be able to remove the card-shaped data carriers D individually from the exchangeable magazine 1 through the dispensing slot 1*e,* the magazine support 2 is provided with a vertically slidable support bottom 3 which is illustrated best in FIGS. 8 and 9. This support bottom 3 is connected to a carriage 4 which is comprised of two parallel extending carriage walls 4*a* and 4*b.* While the forward carriage wall 4*a* is a unitary part of the support bottom 3 by providing an angle iron, the rear carriage wall 4*b* is a separate component that according to FIG. 7 is connected by two screw bolts 4*c* to the forward carriage wall 4*a.*

The support bottom 3, which is shown in a top view in FIG. 9, is forked-shaped with two bottom halves 3*a* positioned at a spacing to one another. Each bottom half 3*a* is provided with a lateral recess 3*b* into which a respective leg 1*c* of the magazine 1 penetrates, as can be seen in FIG. 9. This ensures that the magazine 1 cannot be removed from the magazine support 2 as long as the support bottom 3 is within its working range.

In front of the forward carriage wall 4*a* of the carriage 4, four rollers 5 are freely rotatably arranged which engage in pairs the guide groove 2*d* of the magazine support 2 so that the carriage 4 can be moved vertically along the magazine support 2.

The drive of the carriage 4 is realized by a motor 6 that is arranged at the lower end of the magazine support 2 and by a flexible pulling element that in the shown embodiment is a toothed belt 7. The pulling element may also be a V-belt or a chain. This toothed belt 7 is guided about two guide pulleys 8*a* and 8*b* arranged outside of the movement range of the magazine support 2, whereby the lower guide pulley 8*a* is positioned on the drive shaft of the motor 6 and is thus driven by the motor 6 in both directions.

Figure 4:
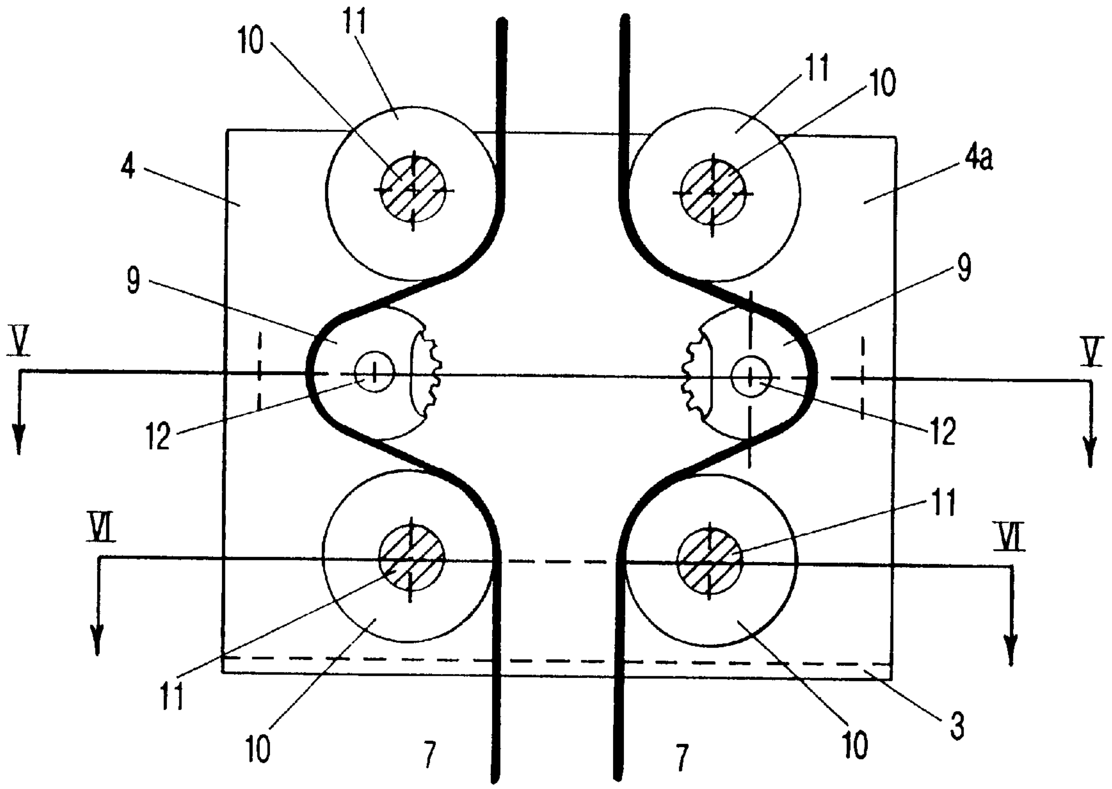
FIG. 4 shows an enlarged representation of the carriage according to section line VI—VI of FIG. 2.
Figure 5:
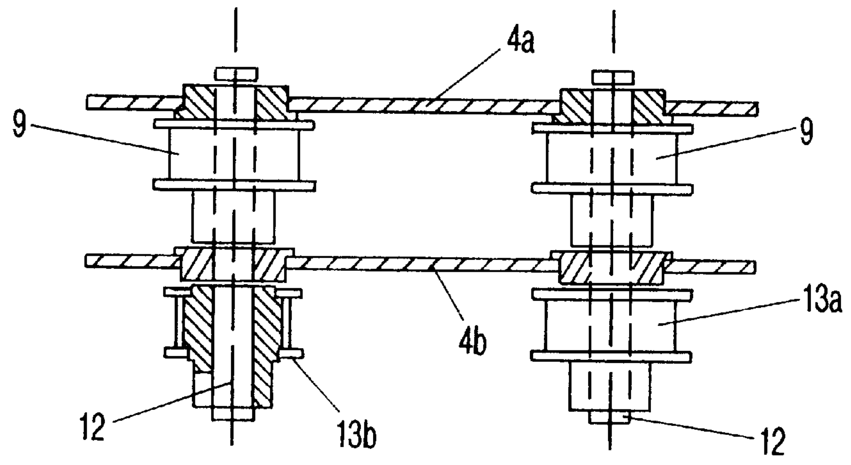
FIG. 5 shows a cross-section of the carriage according to section line V—V of FIG. 4.
Figure 6:
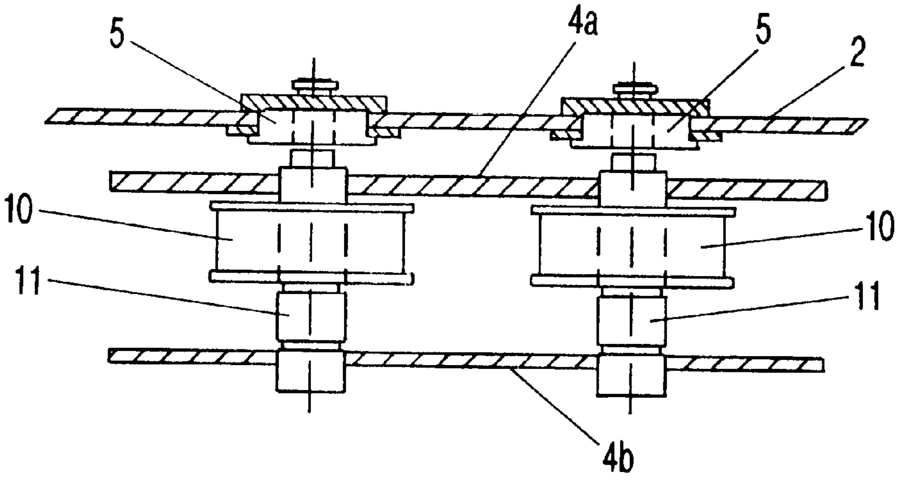
FIG. 6 shows a further cross-section of the carriage according to the section line VI—VI of FIG. 4.

As can be seen in FIGS. 4 through 8, between the two carriage walls 4*a* and 4*b* of the carriage 4 two drive rollers 9 are rotatably supported which cooperate respectively with one side of the toothed belt 7. In order to provide for a sufficiently large engagement angle for the toothed belt 7 about the respective drive roller 9, each drive roller 9 is provided with two laterally displaced guide rollers 10 as can be seen in FIG. 4. They are freely rotatably supported on an axle 11 on which also the rollers 5 are freely rotatably supported (FIG. 6). On a plan view, the axes of the rollers 9 and 10 define a triangle, i.e., lateral displacement refers to the axes not being aligned on a straight line.

As can be seen especially in FIG. 5, the drive rollers 9 are fixedly connected to the shaft 12 projecting to the rear from the rear carriage wall 4*b* of the carriage 4. On this projecting end of each shaft 12 a respective differential roller 13*a,* 13*b* is fixedly mounted.

While the drive rollers 9 have the same diameter and the same number of teeth, the differential rollers 13*a* and 13*b* have different diameters and a different number of teeth. In the shown embodiment, the drive rollers 9 have 21 teeth, the differential roller 13*a* has also 21 teeth and the differential roller 13*b* has 18 teeth. The differential rollers 13*a* and 13*b* are connected to one another by an endless flexible connecting element that, in the shown embodiment, is an endless toothed belt 14 (FIG. 7). In order to simplify the drawings, in FIGS. 4 through 6 and 8 the toothed belt 7 as well as the toothed belt 14 have been omitted. In FIG. 2, the toothed belt 7 is indicated only as a dashed line, while the toothed belt 14 has been omitted.

When the toothed belt 7 is driven by the guide pulley 8*a* and the motor 6 in one of the two rotary directions, the drive rollers 9 of the carriage 4 are rotated in the same rotary direction and at the same angular speed. Since the drive rollers 9 are however fixedly connected via the shafts 12 to the differential rollers 13*a* and 13*b,* respectively, which have different numbers of teeth, depending on the rotary direction of the toothed belt 7 a relative movement of the carriage 4 in the longitudinal direction of the magazine support 2 results because the differential rollers 13*a* and 13*b* have different rotary angles so that a relative movement of the carriage 4 relative to the circulating toothed belt 7 is produced. The resulting differential gear is self-locking for the circulating toothed belt 7 and allows a linear processing of large forces. The ratio of number of teeth of the differential roller 13*a* and 13*b* defines the travel stroke for movement of the carriage 4 relative to the magazine support 2 and thus for the movement of the support bottom 3 arranged at the carriage 4. By controlling the motor 6 it is thus possible to supply the card-shaped data carrier ID within the magazine 1 to the dispensing slot 1*e.*

In order to remove the respectively uppermost card-shaped data support ID from the magazine 1, a selection motor 15 is provided having a drive shaft that functions as the individualization roller 15*a.* Individualization roller 15*a* acts on the upper side of the respectively uppermost card-shaped data carrier D in the magazine 1. The motor housing of the selection motor 15 is pivotable about a pivot axis 15*b* extending parallel to the motor axis (drive shaft) and is provided with a switching arm 15*c* which cooperates with a switch 16.

Because of the weight of the eccentrically suspended selection motor 15, the individualization roller 15*a* has a sufficient pressure force acting on the upper side of the respectively uppermost card-shaped data carrier D in the magazine 1, optionally reinforced by a spring. As soon as this uppermost data carrier 3 is moved by the support bottom 3 within the magazine 1 in the upward direction such that the pivot movement of the housing causes the switching arm 15*c*, connected to the pivotable selection motor 15, to actuate the switch 16, the individualization roller 15*a* according to FIG. 10 is driven counter clockwise in order to move the data carrier D out of the dispensing slot 1*e* of the magazine 1.

When the card-shaped data carrier D exits from the dispensing slot 1*e*, the forward edge of the data carrier D is engaged between the roller pair formed by the transport roller 17 and a retaining roller 18. The transport roller 17 is driven by the transport motor 19 and drives by an intermediate gear 20 the retaining roller 18 in the same rotary direction as the transport roller 17. Between the transport roller 17 and the retaining roller 18 a transport gap is formed that has a width that is greater than the thickness but smaller than twice the thickness of the card-shaped data carrier D. This ensures that the transport roller 17 positioned above the dispensing slot 1*e* engages the card-shaped data carrier D and removes it completely from the magazine 1 while the retaining roller 18, which rotates with its top side in the opposite direction as the transport roller 17, can entrain a second data carrier D that has been frictionally engaged or adhesively engaged to the first dispensed data carrier D and is returned into the magazine 1. The transport gap between the roller 17 and roller 18 can be adjusted to the thickness of the data carriers D to be dispensed.

The roller pair comprised of the transport rollers 17 and the retaining roller 11 has arranged downstream thereof in the shown embodiment a removal roller pair comprised of a removal roller 21, which is driven by the intermediate gear 20 in the same direction as the transport roller 17, and comprised of a counter removal roller 22 that is freely rotatably supported and forced by a spring against the driven removal roller 21. The arrangement of two roller pairs increases the reliability of removal (transport) of the card-shaped data carrier D out of the magazine 1.

The transport roller 17 can be driven by the transport motor 19 in both rotary directions in order to transport data carriers D coming from the respective magazine 1 to a further processing, respectively, to a dispensing unit, but can also transport data carriers from a magazine arranged downstream thereof to an arranged upstream. For this purpose, the transport rollers 17 cooperates with a pressure roller 23 arranged above. The transport gap formed between these rollers 17 and 23 has arranged thereat a guide plate 24 on which the data carriers D passing the magazine 1 above the individualization roller 15*a* will rest. In the shown embodiment, the roller 21 is driven in the same direction as the transport roller 17 and has coordinated therewith a pressure roller 25. In order to allow for this transporting action, the retaining roller 18 rotates freely upon driving of the transport roller in the clockwise direction.

Figure 11:
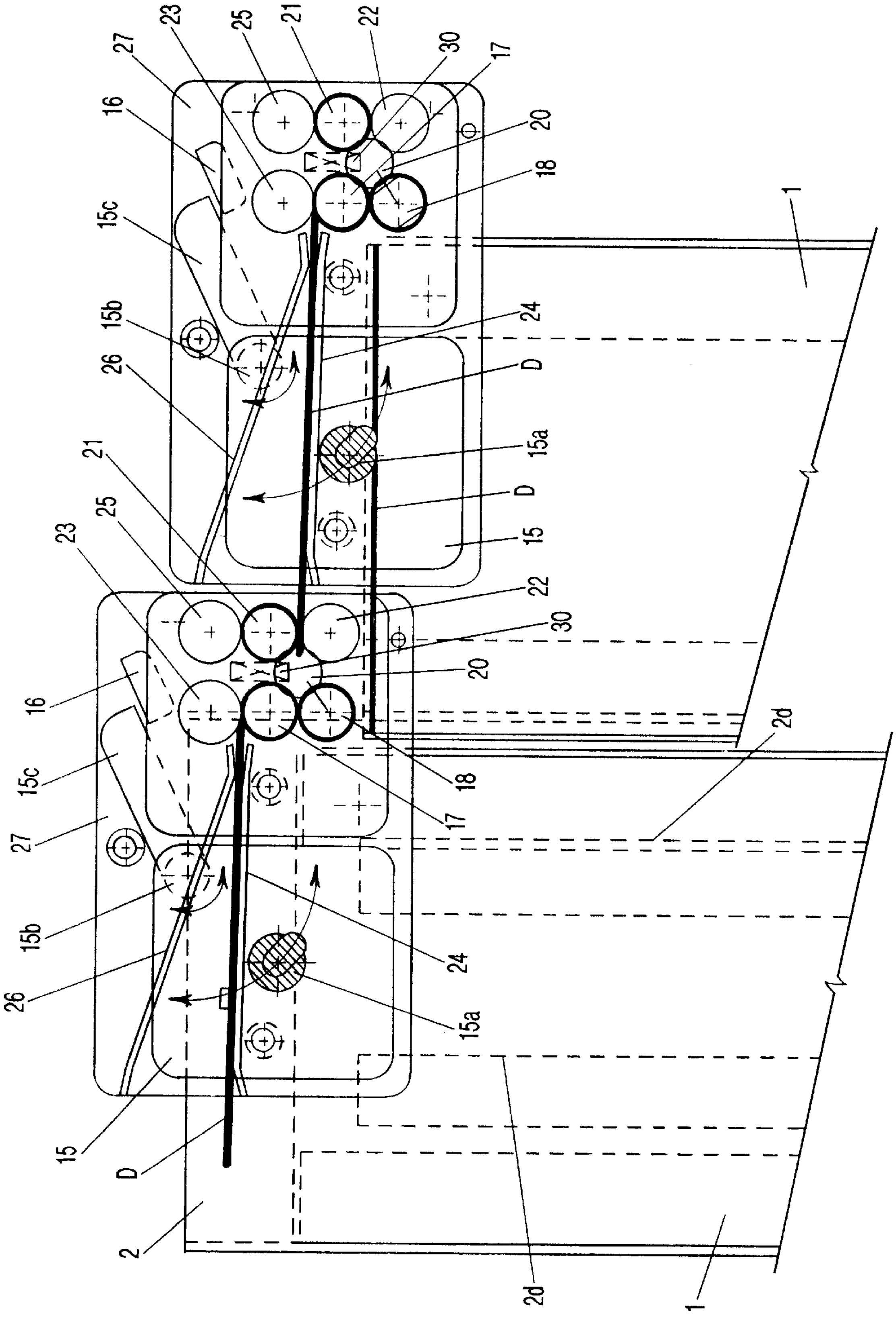
FIG. 11 shows two adjacently positioned storage units in a front view corresponding to FIG. 10.

When the storage device comprises a plurality of storage units, as is shown schematically in FIG. 11 with two storage units, neighboring storage units are displaced vertically by the spacing (transport gap) between the transport rollers 17 and 18 and by the spacing (transport gap) between the transport roller 18 and the pressure roller 23. In this manner, as shown in FIG. 11, the card-shaped data carrier D removed from the magazine 1 of the storage unit shown to the left and exiting the transporting device, including the transport motor 19, is reliably guided onto the upper side of the guide plate 24 of the storage unit (shown to the right) and is guided into the respective gap between the transport roller 17 and the pressure roller 23. When data carriers D which originated at a storage unit upstream are removed from the left storage unit by the transport device, they are guided through the gap between the roller 21 and the pressure roller 25. This card shaped data carrier D is also reliably guided to the gap between the transport roller 17 and the pressure roller 23 of the storage unit arranged downstream by a guide member 26 that effects a funnel-shaped guiding of this data carrier D to the respective gap.

FIGS. 10 and 11 show that a support housing 27 is arranged upstream of the magazine support 2 in which the selection motor 15, the transport motor 19, and all corresponding rollers are arranged. This provides a simple constructive unit.

After connecting a magazine 1 filled with card-shaped data carriers D to the magazine support 2, which is only possible when the support bottom 3 is positioned below the magazine bottom 1*f*, the support bottom 3 is lifted by the motor 6 and the toothed belt 7 as well as the corresponding differential gear until the selection motor 15 is pivoted by the uppermost card-shaped data carrier D within the magazine 1 into the working position and the switch 16 is actuated. By turning on the selection motor 15 the respectively uppermost card-shaped data carrier D can be removed from the magazine 1 and guided to the transport device driven by the transport motor 19. This transport device is also able to guide data carriers D coming from another magazine to a processing unit or to a dispensing unit, as has been disclosed above. A monitoring element 28, for example, an optoelectric element, is arranged between the roller pairs 17, 18 and 21, 22 in order to ensure reliable transport of the card-shaped data carriers D out of this area.

The specification incorporates by reference the disclosure of European priority document 97 115 156.8 of 2 Sept. 1997.

The present invention is, of course, in no way restricted to the specific disclosure of the specification and drawings, but also encompasses any modifications within the scope of the appended claims.

What is claimed is:

1. A storage device for card-shaped data carriers, said storage device comprising:

at least one storage unit comprised of a magazine support (2) and a magazine (1) mounted on said magazine support (2);

said at least one storage unit having a support bottom (3) on which data carriers (D) are stacked;

said magazine (1) having an upper end with a dispensing slot (1*e*);

an individualization roller (15*a*) positioned at said upper end for removing an uppermost data carrier from said magazine (1) through said dispensing slot (1*e*);

a transport device (17) for transporting the data carrier exiting from said dispensing slot (1*e*) to a processing unit or a dispenser;

a carriage (4) mounted in said magazine support (2) and vertically slidable in said magazine support (2);

said support bottom (3) fastened to said carriage (4);

a motor (6);

an endless, flexible pulling element (7) connected to said motor (6) and said carriage (4) and driving said carriage (4);

two guide pulleys (8*a,* 8*b*) connected to opposite ends of said magazine support (2), wherein said pulling element (7) is guided about said guide pulleys (8*a,* 8*b*);

said carriage (4) having two freely rotating drive rollers (9) and a differential gear (13*a,* 13*b,* 14) connecting said drive rollers (9);

said drive rollers (9) rotating in a same direction and having an identical diameter;

said drive rollers (9) driven by said pulling element (7).

2. A storage device according to claim 1, further comprising a first and a second shaft 12 rotatably connected to said carriage (4), wherein:

said differential gear is comprised of two differential rollers (13*a,* 13*b*) having different diameters and an endless flexible connecting element (14) connecting said two differential rollers (13*a,* 13*b*) to one another;

a first one of said drive rollers (9) and a first one of said differential rollers (13*a,* 13*b*) are mounted fixedly on said first shaft (12)

a second one of said drive rollers (9) and a second one of said differential rollers (13*b*) are fixedly mounted on said second shaft (12).

3. A storage device according to claim 2, wherein said endless flexible pulling element (7) and said flexible connecting element (14) are toothed belts and wherein said drive rollers (9) and said differential rollers (13*a,* 13*b*) are toothed wheels.

4. A storage device according to claim 1, wherein said carriage (4) further comprises a pair of guide rollers (10) for each one of said drive rollers (9), wherein said pair of guide rollers (10) is positioned on opposite sides of said drive roller (9), wherein axial centers of said drive roller (9) and said guide rollers (10) define a triangle, wherein said pulling element (7) is guided about said guide rollers (10).

5. A storage device according to claim 1, wherein carriage (4) comprises rollers (5) for guiding said carriage in said magazine support (2).

6. A storage device according to claim 1, wherein said magazine (1) is exchangeable and comprises a fixed magazine bottom (1*f*) for receiving the data carriers (D) and wherein said magazine support (2) has two support arms (2*a*) for securing said magazine (1) at said magazine support (2).

7. A storage device according to claim 6, wherein said fixed magazine bottom (1*f*) has a cutout for said support bottom (3).

8. A storage device according to claim 6, wherein said support bottom (3) has lateral recesses (3*b*) and wherein said magazine (1) has projecting wall portions (1*c*) engaging said lateral recesses (3*b*).

9. A storage device according to claim 8, wherein said magazine (1) has a C-shaped cross-section, wherein legs of said C-shaped cross-section facing one another form said projecting wall portions (1*c*), wherein said lateral recesses (3*b*) are located on opposite sides of said support bottom (3) and are respectively engaged by one of said legs (1*c*)).

10. A storage device according to claim 6, wherein said support arms (2*a*) are slanted and wherein said magazine (1) has a slanted bottom portion received on said slanted support arms (2*a*).

11. A storage device according to claim 6, wherein said magazine support (2) has a bracket (2*b*) having a lock bolt (2*c*) and wherein said magazine (1) has a receiving opening, said magazine (1) placed onto said bracket (2*b*) and secured by inserting said lock bolt (2*c*) into said receiving opening.

12. A storage device according to claim 1, further comprising a selection motor (15) having a motor housing and wherein said individualization roller (15*a*) is an output shaft of said selection motor (15), said housing connected to said magazine support (2) and pivotable about a pivot axis extending parallel to an axis of said individualization roller (15*a*).

13. A storage device according to claim 12, wherein said support bottom (3) and the data carriers (D) resting on said support bottom (3) push from below against said individualization roller (15*a*) and pivot said housing and said individualization roller (15*a*) into a working position.

14. A storage device according to claim 13, wherein said working position of said individualization roller (15*a*) is monitored by a switch (16) actuated by said housing being pivoted into said working position.

15. A storage device according to claim 1, wherein said transport device (17) is arranged laterally above said dispensing slot (1*e*) and comprises a transport motor (19) and a transport roller (17) driven by said transport motor (19), wherein said transport device further comprises an intermediate gear (20) and a retaining roller (18) positioned below said transport roller (17) and driven by said intermediate gear (20) to rotate in the same direction as said transport roller (17), wherein between said transport roller (17) and said retaining roller (18) a first transport gap is formed having a width greater than a thickness of the data carrier (D) and smaller than twice the thickness of the data carrier (D).

16. A storage device according to claim 15, wherein said transport device further comprises a removal roller pair comprised of a first removal roller (21) engaged by said intermediate gear (20) and driven in the same direction as said transport roller (17) and further comprised of a freely rotatable counter removal roller (22) cooperating with said first removal roller (21).

17. A storage device according to claim 16, wherein said transport device further comprises a pressure roller (23) arranged above and cooperating with said transport roller (17), wherein a second transport gap is formed between said transport roller (17) and said pressure roller (23), and further comprising a guide plate (24) coordinated with said second transport gap for guiding a data carrier coming from a neighboring magazine into said second transport gap, wherein said transport roller (17) is drivable in opposite directions.

18. A storage device according to claim 17, wherein neighboring ones of said magazines are vertically displaced relative to one another by a width of said first and second transport gaps.

19. A storage device according to claim 17, wherein above said guide plate (24) a guide member (26) is arranged for guiding data carriers (D) of a neighboring magazine into said second transport gap.

20. A storage device according to claim 12, wherein said selection motor (15) and said transport device are arranged in a support housing 27 mounted above said magazine (1) at said magazine support (2).

* * * * *